United States Patent
Kohno

(10) Patent No.: US 7,555,501 B2
(45) Date of Patent: Jun. 30, 2009

(54) APPARATUS AND METHOD FOR RESTORING DATA

(75) Inventor: Shigeru Kohno, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 378 days.

(21) Appl. No.: 10/864,083

(22) Filed: Jun. 9, 2004

(65) Prior Publication Data

US 2005/0021497 A1    Jan. 27, 2005

(30) Foreign Application Priority Data

Jun. 19, 2003  (JP)  ............... 2003-174462

(51) Int. Cl.
  *G06F 17/30* (2006.01)
  *G06F 12/00* (2006.01)
(52) U.S. Cl. ............. 707/202; 711/173; 714/6; 714/15; 714/20
(58) Field of Classification Search ........... 707/1, 707/200, 202; 711/163, 173; 714/6, 15, 714/20, 1; 386/116
See application file for complete search history.

(56) References Cited

U.S. PATENT DOCUMENTS

| | | | | |
|---|---|---|---|---|
| 5,652,865 A * | 7/1997 | Rawlings, III | ............... | 711/171 |
| 5,706,472 A * | 1/1998 | Ruff et al. | ............... | 711/173 |
| 5,742,818 A * | 4/1998 | Shoroff et al. | ............... | 707/200 |
| 6,049,612 A * | 4/2000 | Fielder et al. | ............... | 380/44 |
| 6,178,536 B1 * | 1/2001 | Sorkin | ............... | 714/766 |
| 6,192,488 B1 * | 2/2001 | Li | ............... | 714/15 |
| 6,308,007 B1 * | 10/2001 | Iwasaki | ............... | 386/116 |
| 6,519,762 B1 * | 2/2003 | Colligan et al. | ............... | 717/170 |
| 6,526,488 B1 * | 2/2003 | White et al. | ............... | 711/163 |
| 6,654,954 B1 * | 11/2003 | Hicks | ............... | 717/162 |
| 6,877,109 B2 * | 4/2005 | Delaney et al. | ............... | 714/6 |
| 7,010,721 B2 * | 3/2006 | Vincent | ............... | 714/20 |
| 2001/0018858 A1 * | 9/2001 | Dwek | ............... | 84/609 |
| 2003/0167439 A1 * | 9/2003 | Talagala et al. | ............... | 714/770 |
| 2005/0104977 A1 * | 5/2005 | Nozaki et al. | ............... | 348/231.7 |

(Continued)

FOREIGN PATENT DOCUMENTS

JP    04-199442    7/1992

(Continued)

OTHER PUBLICATIONS

Office Action issued by the Japanese Patent Office Action for related Japanese Patent Application No. 2003-174462 (English translation included).

*Primary Examiner*—Charles Rones
*Assistant Examiner*—Fariborz Khoshnoodi
(74) *Attorney, Agent, or Firm*—Brinks Hofer Gilson & Lione

(57) ABSTRACT

An apparatus and method for restoring data is provided for easily restoring a file that is carelessly deleted from a hard disk. A microcomputer 1 is constructed as follows. An original file and a file for restoration whose extension is different from that of the original file are stored in a HDD unit 3. When it is determined that the original file is not capable of being reproduced, the filename or the extension of the file for restoration may be renamed, thereby restoring the original file. Even when the original file is carelessly deleted or not capable of being reproduced due to its corruption, the original file can be automatically restored using the file for restoration.

16 Claims, 2 Drawing Sheets

VEHICLE AUDIO SYSTEM OF THE PREFERRED EMBODIMENT

U.S. PATENT DOCUMENTS

| | | |
|---|---|---|
| 2006/0149889 A1 * | 7/2006 | Sikha .......................... 711/100 |
| 2006/0265419 A1 * | 11/2006 | Forstall et al. .............. 707/102 |

FOREIGN PATENT DOCUMENTS

| | | |
|---|---|---|
| JP | 06-301586 | 10/1994 |
| JP | 2002366164 | 12/2002 |
| JP | 2003084902 | 3/2003 |

* cited by examiner

VEHICLE AUDIO SYSTEM OF THE PREFERRED EMBODIMENT

INTERNAL DATA IMAGE IN HDD UNIT

FUNCTIONAL CONFIGURATION OF MICROCOMPUTER

APPARATUS AND METHOD FOR RESTORING DATA

BACKGROUND OF THE INVENTION

1. Field of the Invention

The present invention relates to an apparatus and method for restoring data, which is suitable for use in an apparatus of restoring music files or image files that are deleted from a recording medium such as a hard disk, a memory card, or the like.

2. Description of the Related Art

In conventional audio visual (AV) systems for home or vehicle use, a medium for recording music may be a compact disk (CD), a mini disk (MD), a cassette tape, or the like. A medium for recording images may be a video tape, a digital versatile disk (DVD), or the like. Recently, a hard disk has also been used as a medium for recording music or images.

In the case of using the hard disk, data on music or images is recorded or stored in a file thereof. When the data on music or images is recorded on the hard disk in the file format, such a file may be manipulated on a personal computer. This enables music files or image files recorded on the hard disk in the AV system to be downloaded into the computer, and to be optionally edited on the computer.

Conventionally, a removable recording medium, such as a memory card, a rewritable CD or DVD, or the like, is used to indirectly download files from the AV system into the computer. Recently, a new system has been proposed in which the AV system and the computer are connected to each other through a local area network (LAN), so that a file recorded on the hard disk in the AV system can be directly manipulated from the computer. Also, another AV system has been proposed in which a hard disk itself is detachably mounted on the AV system body, and the hard disk after being removed from the body can be connected to the computer.

In cases where the music files or image files recorded onto the hard disk in the AV system are directly recognizable (viewable) from the computer, not only editing of the file, but also deletion thereof may be easily performed. Thus, the file recorded on the hard disk in the AV system is carelessly deleted from the computer. Thereafter, such music or images will not be able to be reproduced.

In cases where a file is indirectly downloaded from the hard disk of the AV system into the personal computer via the memory card or the like, an original file still remains in the hard disk. Even if the file downloaded into the computer is carelessly deleted, the AV system permits reproduction of the music or images without problems. On the other hand, when directly manipulating the hard disk in the AV system, the original file is carelessly deleted itself, so that the file will not be able to be reproduced.

Thus, under the assumption that the file is carelessly deleted despite the user's intentions, a backup copy of the file should be preferably created. The backup copy is to be made in a recording medium (in many cases, a hard disk in the personal computer) that is different from the hard disk in the AV system. Conventionally, a device has been proposed that is designed to eliminate the trouble of backup management of contents, as disclosed in Japanese Unexamined Patent Publication No. 2002-366164.

In the foregoing prior art, however, although the trouble of backup management is alleviated, certain backup work still needs to be performed by a user. When the deleted file is intended to be restored, predetermined restoring work must be disadvantageously carried out by connecting the hard disk in the AV system to the personal computer as the backup side.

It should be noted that when file deletion is performed on the hard disk, contents of data are not deleted, only management information (FAT: File Allocation Tables) concerning access to the data is rewritten. Therefore, manipulation of this FAT makes it possible to restore the deleted file. This restoring method, however, requires special expertise as well as troublesome work, which leads to a problem that the file cannot be easily restored.

SUMMARY OF THE INVENTION

The present invention is to solve the foregoing problems encountered with the known art, and it is an object of the present invention to provide an apparatus and method for restoring data that permits easy restoration of a file which is not capable of being reproduced due to careless deletion from a hard disk, without the user's troublesome backup and restoration work.

In order to solve the foregoing problems, in an apparatus for restoring data according to the present invention, a recording medium stores therein an original file and a file for restoration which differs from the original file in at least one of a filename and an extension. When it is determined that the original file is not capable of being reproduced, the file for restoration is renamed such that a filename of this file conforms to that of the original file, thereby restoring the original file to a reproducible state.

With this arrangement of the present invention as described above, for instance, in cases where the original file stored in the recording medium is carelessly deleted, if reproduction of the original file is instructed, then the file for restoration pre-stored is automatically renamed, to thereby restore the original file. Therefore, this saves the user's troublesome backup and file restoration work.

Further, there are prepared the original file, and the file for restoration which has the same data contents as those of the original file, but a different filename from that of the original one. Not only when the original file is virtually deleted by rewriting FAT or the like, but also when data is actually broken itself and the original file is not capable of being reproduced, file restoration can be automatically performed using the file for restoration, leading to a reproducible file.

DESCRIPTION OF THE PREFERRED EMBODIMENTS

Figure 1:
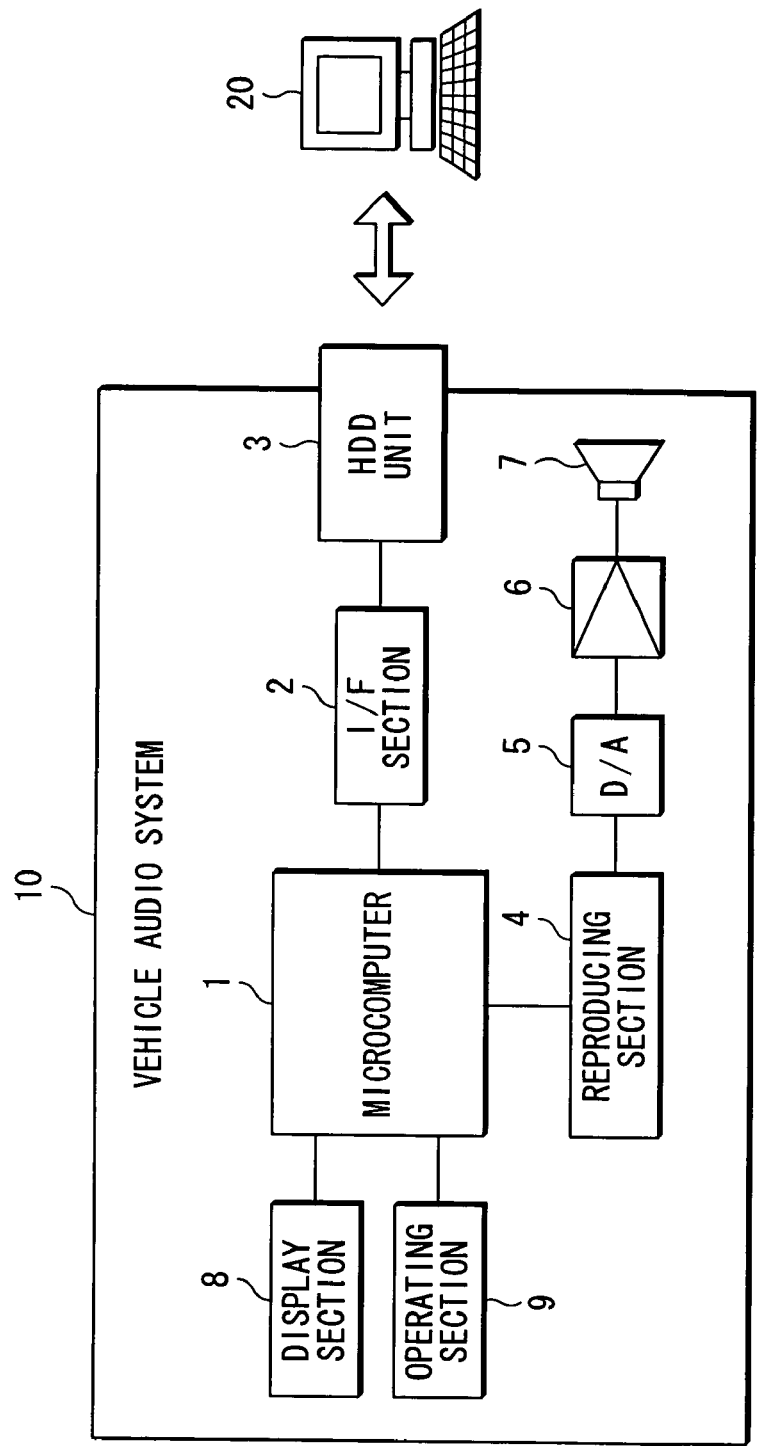
FIG. 1 is a functional block diagram showing the configuration of a vehicle audio system in which an apparatus for restoring data according to the present invention is employed.

One preferred embodiment of the present invention will be explained hereinafter with reference to the accompanying drawings. FIG. 1 is a functional block diagram showing the configuration of a vehicle audio system in which an apparatus for restoring data of the present invention is employed.

As shown in FIG. 1, the vehicle audio system 10 of the preferred embodiment includes a microcomputer 1 composed of a CPU, a ROM, a RAM, and the like, an interface section 2, a hard disk drive (HDD) unit 3, a reproducing section 4, a D/A converter 5, an amplifier 6, a speaker 7, a display section 8, and an operating section 9.

The microcomputer 1 is designed to control the whole vehicle audio system 10. It controls a series of processing, e.g., controls the interface section 2 to read out a music file stored in the HDD unit 3, and supplies the read file to the reproducing section 4, thus causing the music to be reproduced. The details of the functional configuration included in the microcomputer 1 will be explained below.

The interface section 2 exchanges data between the microcomputer 1 and the HDD unit 3. The HDD unit 3 is detachably mounted on a body of the vehicle audio system 10. This HDD unit 3 includes, for example, a universal serial bus (USB) terminal, and a recommended standard 232 version C (RS-232C) terminal, and is detachably connected to a personal computer 20. By connecting the HDD unit 3 removed from the vehicle audio system 10 to the computer 20, the music file stored in the HDD unit 3 is directly recognizable from the computer 20, so that the music file is capable of being optionally edited or deleted.

The HDD unit 3 stores a playlist as well as the music files. The playlist records a plurality of music files as a single group (for example, with a plurality of pieces of music in one album gathered into one group). For example, the list records therein a song name and an address indicating its recording place in the music file, in pairs for each song. The microcomputer 1 executes reproduction control of music files using this playlist, for example.

That is, when a desired playlist is selected from among playlists displayed on the display section 8 composed of a LCD or the like by the user's operation of the operating section 9 composed of a remote controller or the like, the microcomputer 1 reads out music files including several pieces of music designated by the selected list from the HDD unit 3 in sequence, to supply the read files to the reproducing section 4.

It should be noted that the method of reproducing music is not limited to one using the playlist. For example, each music file may be designated to be reproduced. Instruction to execute a reproduction function of preinstalled data enables reproducing music files preinstalled in the HDD unit 3 in sequence.

Under control of the microcomputer 1, the reproducing section 4 decodes the music file read from the HDD unit 3, and then outputs the decoded file to the D/A converter 5. The D/A converter 5 converts digital music data reproduced by the reproducing section 4 into an analog audio signal. The amplifier 6 amplifies the analog audio signal outputted from the D/A converter 5 up to a predetermined level. The speaker 7 outputs reproduced voice based on the analog audio signal amplified by the amplifier 6.

Figure 2:
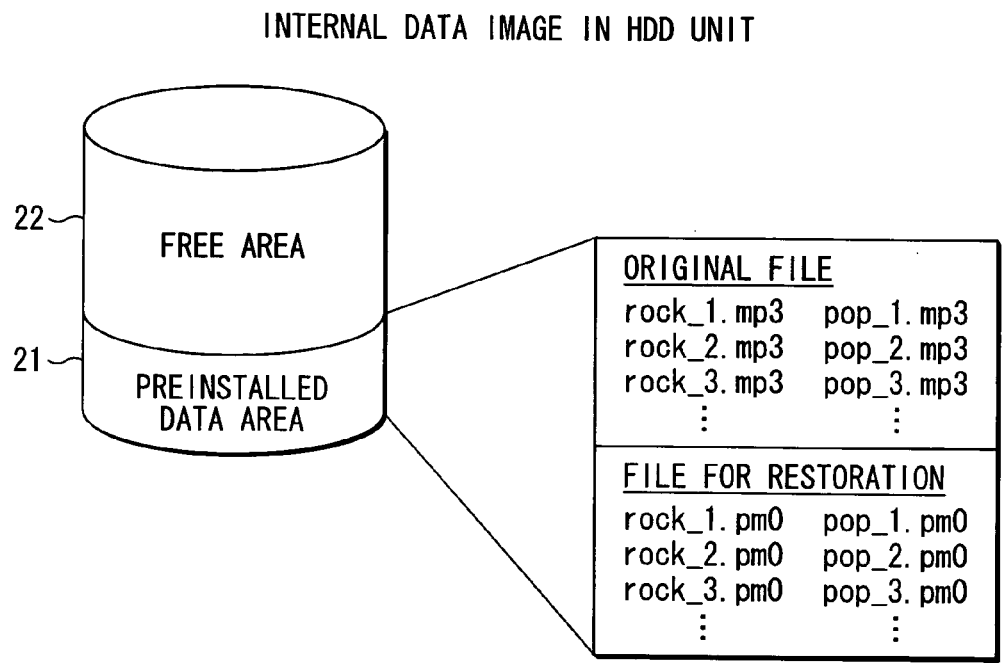
FIG. 2 is a diagram showing an internal data recording image in a HDD unit according to one preferred embodiment.

FIG. 2 shows an internal data recording image in the HDD unit 3. As shown in FIG. 2, the HDD unit 3 includes an area for preinstalled data 21 in which several kinds of music files are preinstalled at the time of product shipment, and a free area 22 in which the user can freely read and write an arbitrary music file after purchasing the product.

In the preinstalled data area 21, the original file and a file for restoration are recorded. The file for restoration is identical to the original file in contents of music data and the filename, but differs from the original file only in the extension. For example, when the music file is in the MP3 (MPEG-1 Audio Layer-3) format, an extension of the original file is "mp3", while an extension of the file for restoration is "pm0".

The file for restoration, which has the extension of "pm0", is a hidden file (which is a file controlled not to be displayed in a list provided by a file browsing and operating software), and is not displayed on the display section 8. This file for restoration is not capable of being recognized by the computer 20, and is not displayed on a display of the computer 20. Thus, this file for restoration cannot be edited or deleted. On the other hand, the original file is capable of being recognized (viewed) by both the vehicle audio system 10 and the personal computer 20, so that it can be optionally edited or deleted.

In the preinstalled data area 21, various types of music files are prepared for each musical genre. In reproduction of the preinstalled data, a desired musical genre may be designated. That is, when rock is designated by the user's operation of the operating section 9, the original file of the rock is read out to be reproduced. In reproduction of music, the file for restoration is not utilized. Thus, the HDD unit 3 with the original file and the file for restoration recorded in the preinstalled data area 21 corresponds to the recording medium of the present invention.

Figure 3:
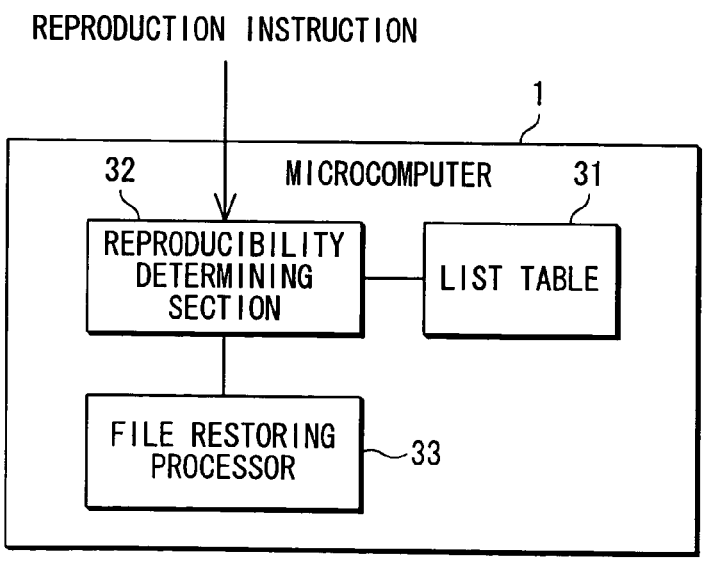
FIG. 3 is a block diagram showing the functional configuration of a microcomputer according to one preferred embodiment.

FIG. 3 is a block diagram showing the functional configuration of the microcomputer 1 according to the invention. As shown in FIG. 3, the microcomputer 1 includes a list table 31, a reproducibility determining section 32, and a file restoring processor 33. The list table 31 is a memory that stores table information about management of the music files recorded in the preinstalled data area 21 as a list.

The reproducibility determining section 32 determines whether the original file recorded in the preinstalled data area 21 is capable of being reproduced or not. Concretely, when the execution of reproducing function of the preinstalled data is instructed by the user's operation of the operating section 9, the determining section 32 checks the original file in the preinstalled data area 21 with reference to the list stored in the list table 31, and determines whether there are any files that are deleted and not capable of being reproduced.

The original file, the reproducibility of which is determined by the reproducibility determining section 32, is the only original file which is instructed to be reproduced by the user. For example, when rock is designated as a music genre and reproduction of its preinstalled data is instructed, the determining section 32 determines the reproducibility of only the rock original file.

It should be noted that although all original files recorded in the preinstalled data area 21 may have their reproducibility determined, a warm-up or startup time in this case, which is taken by the apparatus before it starts to reproduce music, if necessary, after performing file restoration based on the determination, will be much longer. In contrast, the number of the original files of interest may be preferably decreased, resulting in shorter warm-up time.

The file restoring processor 33, when it is determined that there is any deleted original file (or a file that is not capable of being reproduced), makes a copy of the file for restoration having the same filename as that of the deleted original file. And an extension "pm0" of the copied file is changed or modified to the same as that of the original file, i.e., "mp3", thereby restoring the original file to its reproducible state.

Thereafter, the microcomputer 1 reads out the original files (a plurality of files belonging to a designated genre) in sequence including files restored by the file restoring processor 33 as necessary, from the HDD unit 3, to thereby supply the read files to the reproducing section 4, which executes reproduction of music.

As explained above in detail, in the preferred embodiment, when reproduction is instructed by the user, it is determined whether there are any deleted original files. If there is any original file deleted, the file for restoration stored in advance other than the original file is renamed to have the same name as that of the original file, thereby restoring the original file to its reproducible state.

Thus, even if the original file preinstalled in the HDD unit 3 is carelessly deleted in the vehicle audio system 10 or the personal computer 20, the original file is automatically restored using the file for restoration without the user's troublesome file restoration work.

In the present embodiment, file restoration is carried out by making copies of the filename and extension so as to conform to the deleted original file, using the file for restoration. Although such a method including the steps of making copies and renaming is executed, the file for restoration is still maintained as it is. Accordingly, in cases where the same original file, i.e., the file obtained by restoration, is deleted again, file restoration can be performed again by renaming the file for restoration once more.

It should be noted that although in the above embodiment, a file that has the same filename as that of the original file, but a different extension from that of the original file, is used as the file for restoration, a file that has the same extension as that of the original file, but a different filename from that of the original file, may be alternatively used as the file for restoration. Further, a file that differs from the original file in both filename and extension may also be used as the file for restoration. In the former, a predetermined hidden attribute is set or contained not in the extension but in the filename, thereby causing the file for restoration to function as a hidden file.

Moreover, in cases where the file for restoration has a filename different from that of the original file, it is necessary to manage correspondence of the original file to the file for restoration which conforms to the original one. On the other hand, if the filename of the original file is set to the same as that of the file for restoration as disclosed in the above-mentioned embodiment, there is no need to manage the correspondence as described above, and the files having the same contents can be identified only by their filenames, thus advantageously leading to easy management of the files.

In the above embodiment, it is determined whether there are any deleted original files, before reproduction of the preinstalled data. And if there is any deleted original file, then the original file is restored by renaming the file for restoration. Additionally, after starting reproduction, it is determined whether there are any original files that are not capable of being reproduced. If there is any original file that cannot be reproduced, then the original file may be restored from the file for restoration in the same manner as the above-mentioned case.

Even if the user does not delete the original file and the file exists itself, the original file is often broken and not capable of being reproduced due to some reasons. In this case, since the original file exists itself, the determination of deletion of the file cannot trigger the file restoration using the file for restoration. In this case, when an instruction to reproduce the broken file is given to the reproducing section 4, if the reproducibility determining section 32 detects that this file is not capable of being reproduced, the file restoring processor 33 performs file restoration processing, whereby the broken file is reconstructed or restored to its reproducible state.

In the conventional method of restoring file using FAT, no file is provided in addition to the original file. In cases where the original file is broken, no matter how well FAT is operated, the file restoration cannot be carried out to obtain a reproducible file. In contrast, in the present embodiment, there are prepared the file for restoration as well as the original file. This restoration file has the same data contents as that of the original file and a different extension from that of the original file. Therefore, not only when the original file is virtually deleted by rewriting the FAT, but also when the data is actually broken itself and the original file is not capable of being reproduced, the file restoration is automatically carried out to make a reproducible file.

Although, in the above-mentioned embodiment, the reproducibility determining section 32 checks deletion of a plurality of original files as a single unit before reproduction, which files belong to a designated genre, and reproducibility of these files may be successively checked from one piece of music to another upon its reproduction. Also, in this case, reproducibility of the original files as well as deletion thereof can be determined. The operation of the reproducibility determining section 32 in this case will be explained in the following.

When an instruction to perform a function of reproducing preinstalled data is given by the user's operation of the operating section 9, the reproducibility determining section 32 checks the preinstalled data area 21 with reference to a list stored in the list table 31, and determines whether the original file of the first piece of music has been deleted or not. If it has been deleted, the file restoring processor 33 renames the file for restoration.

If the first piece original file is not deleted, a reproduction instruction is given to the reproducing section 4, and it is further determined whether this file is not capable of being reproduced due to its corruption. If it is not capable of being reproduced, the file restoring processor 33 renames the file for restoration to restore the original file, and an additional reproduction instruction is again given to the reproducing section 4.

Next, the reproducibility determining section 32 determines whether the original file of the second piece of music has been deleted or not, after completion of reproduction of the first piece. If it has been deleted, the file restoring processor 33 renames the file for restoration. If it is not deleted, a reproduction instruction is given to the reproducing section 4, and it is further determined whether this file is not capable of being reproduced. If it is not capable of being reproduced, the file restoring processor 33 renames the file for restoration to restore the original file. The third piece or later will be processed in the same way.

In the above embodiment, every time an original file is deleted, file restoration is carried out using the file for restoration. Alternatively, a message indicative of file deletion may be displayed on the display section 8 to inform the user of the deletion, and only when an instruction to restore the file is given by the user's operation of the operating section 9, the original file may preferably be restored by renaming the file for restoration. This prevents the original file deliberately deleted by the user from being restored.

Further, in the above embodiment, restoration of the music files in the preinstalled data area 21 will be described. The music file in the free area 22 may be restored in the same manner. That is, when recording in the free area 22, not only original files, but also files for restoration may be automatically recorded therein, thus making it possible to apply file restoration processing in the same way as the foregoing embodiment.

In this case, the reproducibility determining section 32 determines whether there are any original files deleted, with reference to the playlist recorded in the HDD unit 3, for example. That is, even if an original file is deleted, information on the deleted file is intended to remain in the playlist, and the existence of the original files is confirmed with reference to the playlist, thereby checking the deletion of original files.

In the above embodiment, as an example of a usable recording medium in both the vehicle audio system 10 and the personal computer 20, the HDD unit 3, which is detachably mounted on the audio system 10, is employed. Instead of this HDD unit, a memory card, a rewritable CD or DVD, or another removable recording medium may be employed. The recording medium is not limited to one that is detachably mounted on the vehicle audio system 10. That is, by linking the vehicle audio system 10 and the personal computer 20 by wired or wireless connections, a recording medium fixed inside the vehicle audio system 10 may be used on condition that it is directly recognizable (capable of being edited or deleted) from the computer 20.

In the described embodiment, music files in the MP3 format have been explained as one example. The music file may be in other audio compression format, such as an adaptive transform acoustic coding (ATRAC), or a windows media audio (WMA). Also, the music file may be a wave file (WAV) to which an arbitrary compression format can be applied. In short, the data format of the music file is not limited to a specific one. The present embodiment can be applied not only to the music file, but also to an image file in an arbitrary format in the same way.

Although, in the above-mentioned embodiment, a vehicle AV system is taken as an example, the present invention is not limited hereto, and may be applied to an AV system for home use in the same manner.

Moreover, the method of restoring files according to the preferred embodiments as described above can be achieved by either DSP or software. For example, when achieved by software, the apparatus for restoring data according to the embodiment actually comprises a CPU or MPU, a RAM, a ROM, or the like in the computer, and is operated based on programs stored in the RAM and/or ROM.

Therefore, the programs which cause the computer to perform the above-mentioned function of the embodiment are stored in a recording medium such as a CD-ROM, and are read in the computer, thereby achieving the file restoration according to the invention. As a recording medium for recording therein the above programs, in addition to the CD-ROM, a flexible disk, a hard disk, a magnetic tape, an optical disk, a magneto-optic disk, a DVD, a nonvolatile memory card, or the like may be used. The above program may be downloaded in the computer via a network such as the internet.

As is understood by a person skilled in the art, the foregoing preferred embodiments of the invention are illustrative to carry out the invention, and do not limit the technological scope of the invention. That is, the present invention may be embodied in many other specific forms without departing from the spirit or scope of the invention.

As will be seen from the above description, according to the present invention, the original file and the file for restoration are stored in the recording medium, and when it is determined that the original file is not capable of being reproduced, the file for restoration is renamed, to thereby restore the original file. This saves the user's troublesome backup work. Even when the original file is carelessly deleted or not capable of being reproduced due to its corruption, the original file is automatically restored using the file for restoration. This allows the user to easily restore the file which has not been capable of being reproduced, without the troublesome backup and restoration work.

What is claimed is:

1. An audio-video system comprising:
    an audio-video processing section operatively coupled to a recording medium;
    the recording medium having a preinstalled media area configured to contain an original file and a file for restoration, the original file is edited or deleted via user operation, the file for restoration (1) differing from the original file in at least one of a filename and an extension and (2) being a hidden file that cannot be edited or deleted via user operation;
    a reproducibility determining section operatively coupled to the audio-video processing section and configured to determine (a) whether the original file has been deleted and (b) whether the original file is corrupted; and
    a file restoring processor operatively coupled to the audio-video processing section configured to restore the original file to a reproducible state when the reproducibility determining section determines that either the original file has been deleted or is not capable of being reproduced due to corruption, wherein the file restoring processor includes a display section for informing a user that the reproduction of the original file is impossible when the reproducibility determining section determines that the original file is not capable of being reproduced, and the file restoring processor modifies at least one of the filename and the extension of the copied file for restoration when an instruction to restore the file is received from the user in response to the information provided by the display section, and;
    wherein the original file is restored by copying the file for restoration and modifying at least one of the filename and the extension of the copied file for restoration to be the same as that of the original file, while maintaining the file for restoration in an unaltered state for use during subsequent file restorations.

2. The apparatus for restoring data according to claim 1, wherein the file restoring processor includes a display section for informing a user that the reproduction of the original file is impossible when the reproducibility determining section determines that either the original file has been deleted or is not capable of being reproduced due to corruption, and the file restoring processor modifies at least one of the filename and the extension of the copied file for restoration when an instruction to restore the file is received from the user in response to the information provided by the display section.

3. The apparatus for restoring data according to claim 1, wherein the recording medium for storing the file for restoration is a hard disk and the reproducibility determining section determines that the original file is deleted by referencing a playlist of music files.

4. A computer implemented method for restoring data, comprising:
    determining whether an original file has been deleted when the original file is intended to be reproduced from a recording medium having a preinstalled media area configured to contain the original file and a hidden file for restoration, the hidden file (a) being incapable of being altered by user operations and (b) differing from the original file in at least one of a filename and an extension;
    when a determination is made the original file has been deleted from the recording medium, restoring the original file using the hidden file for restoration;
    or if a determination is made the original file has not been deleted from the recording medium, then determining whether the original file is not capable of being reproduced due to corruption;
    restoring the original file to a reproducible state by copying the hidden file and modifying at least one of the filename and the extension of the copied file to be the same as that of the original file so as to conform to the original file when a determination is made the original file is not capable of being reproduced due to corruption, while maintaining the hidden file in an unaltered state for use during subsequent file restorations; and informing a user that the reproduction of the original file is impossible when a determination is made the original file is not capable of being reproduced, and modifying at least one of the filename and the extension of the copied file for restoration when an instruction to restore the file is received from the user in response to the information provided.

5. The method for restoring data according to claim 4, the method comprising, when a determination is made the original file is not capable of being reproduced, copying the hidden file and modifying at least one of the filename and the extension of the copied file, thereby restoring the original file and maintaining the hidden file unaltered for subsequent file restoration.

6. The method for restoring data according to claim 4, the method comprising informing a user that the reproduction of the original file is impossible when a determination is made the original file is not capable of being reproduced, modifying at least one of the filename and the extension of the hidden file for restoration when an instruction to restore the original file is received from the user.

7. The method for restoring data according to claim 4, the method comprising determining whether the original file is capable of being reproduced when reproduction of the original file is instructed.

8. The method for restoring data according to claim 7, the method comprising, when a determination is made the original file is not capable of being reproduced, copying the hidden file for restoration and modifying at least one of the filename and the extension of the copied file thereby restoring the original file.

9. The method for restoring data according to claim 7, the method comprising informing a user that the reproduction of the original file is impossible when a determination is made the original file is not capable of being reproduced, and modifying at least one of the filename and the extension of the hidden file for restoration when an instruction to restore the file is received from the user.

10. The method for restoring data according to claim 4, wherein the recording medium for storing the file for restoration is a hard disk.

11. An apparatus for restoring data, comprising:

an internal recording medium having a preinstalled media area configured to store an original file and a restoration file, the original file and the restoration file containing identical data content, the original file being alterable via user operations and the restoration file being an unalterable hidden file and differing from the original file in at least one of a filename, an extension, and a predetermined attribute;

an audio-video processing section operatively coupled to the internal recording medium;

an integrity unit configured to determine if the integrity of the original file is intact by checking that (1) the original file has not been deleted and (2) the original file is not corrupted;

a processor that utilizes only data content stored in the restoration file to restore the integrity of the original file, without altering the restoration file so as to maintain the restoration file unaltered for use during subsequent file restoration operations, when the integrity unit determines that the integrity of the original file is not intact because the original file has been deleted or is corrupted; and a display section for informing a user that the reproduction of the original file is impossible when a determination is made the original file is not capable of being reproduced, and the processor modifies at least one of the filename and the extension of the copied file for restoration when an instruction to restore the file is received from the user in response to the information provided by the display section.

12. The apparatus for restoring data of claim 11, wherein at least one of the filename, the extension, and the predetermined attribute of the restoration file is modified to restore the original file.

13. The apparatus for restoring data of claim 11, wherein the integrity unit determines that the integrity of the original file is not intact by referencing a playlist to determine that the original file has been.

14. The apparatus for restoring data of claim 13, wherein the processor generates a message on a display indicating that the integrity of the original file is not intact.

15. The apparatus for restoring data of claim 14, wherein the apparatus receives an instruction to restore the original file and the processor restores the original file by copying the restoration file.

16. The apparatus for restoring data of claim 11, wherein the restoration file is protected from inadvertent deletion by the user.

* * * * *